US008907753B2

(12) United States Patent
Willburger et al.

(10) Patent No.: US 8,907,753 B2
(45) Date of Patent: Dec. 9, 2014

(54) ROTARY SOLENOID (75) Inventors: Winfried Willburger, Kirchdorf (DE); Daniel Kreuzer, Kellmunz (DE)

(73) Assignee: Firma SVM Schultz Verwaltungs-GmbH & Co. KG, Memmingen (DE)

(*) Notice: Subject to any disclaimer, the term of this patent is extended or adjusted under 35 U.S.C. 154(b) by 0 days.

(21) Appl. No.: 13/431,385

(22) Filed: Mar. 27, 2012

(65) Prior Publication Data

US 2012/0249272 A1 Oct. 4, 2012

(30) Foreign Application Priority Data

Apr. 1, 2011 (DE) .......................... 10 2011 015 867

(51) Int. Cl.
*H01F 7/14* (2006.01)
*H02K 26/00* (2006.01)
*H01F 7/122* (2006.01)

(52) U.S. Cl.
CPC ................ *H02K 26/00* (2013.01); *H01F 7/145* (2013.01); *H01F 7/122* (2013.01)
USPC ....................................... 335/272

(58) Field of Classification Search
CPC ...... H02K 37/10; H02K 37/125; H01F 7/145; H01F 7/122
USPC ............ 335/272, 220–229; 310/40 R, 49.02, 310/49.21, 49.32, 49.36, 49.53, 49.55, 268
See application file for complete search history.

(56) References Cited

U.S. PATENT DOCUMENTS

| 5,038,063 | A | * | 8/1991 | Graber et al. | 310/115 |
| 5,337,030 | A | * | 8/1994 | Mohler | 310/156.37 |
| 5,677,659 | A | * | 10/1997 | Porcher | 335/272 |
| 2004/0169574 | A1 | * | 9/2004 | Moritsugi | 335/220 |
| 2011/0187483 | A1 | * | 8/2011 | Willburger et al. | 335/230 |

* cited by examiner

*Primary Examiner* — Bernard Rojas
(74) *Attorney, Agent, or Firm* — Loginov & Associates, PLLC; William A. Loginov (57) ABSTRACT The invention provides a rotary solenoid, comprising a stator and rotor that can rotate around a rotational axis, wherein the rotor has a rotor shaft on which a rotor disc is arranged, and the rotor disc, seen in the direction of circumference, has alternating magnetically polarized magnetic poles. The stator carries at least one coil carrying windings for conducting electric current. Between the coil and the rotor disc is a pole face having at least of two partial pole faces for guiding the magnetic flux of the magnetic field generated by the windings when current is applied. Elements of the magnetic system (the magnetic poles, the partial pole faces and the air gap) are configured along the direction of circumference depending on the rotational angle changeable in such a way that a torque results that returns the rotor in the starting position, when the current is switched off.

25 Claims, 3 Drawing Sheets

ROTARY SOLENOID

FIELD OF THE INVENTION

The invention refers to a rotary solenoid, comprising a stator and a rotor that can rotate around a rotational axis, wherein the rotor has a rotor shaft on which a rotor disc is arranged, and the rotor disc has, seen in the direction of circumference, alternating magnetically polarized magnetic poles, and the stator carries at least one coil carrying windings of wire conducting electric current, and the windings encircle the rotational axis, and between the coil and the rotor disc a pole face is provided consisting of at least two partial pole faces serving for guiding the magnetic flux of the magnetic field generated by applying current to the windings of the coil, whereby at the pole face there is a magnetic polarization alternating with reference to the rotational axis, seen in the direction of circumference, and between the rotor disc and the pole face an air gap is provided.

BACKGROUND OF THE INVENTION

Rotary solenoids of this type are drives based on the electro-magnetic principle where instead of a longitudinal motion the result is a rotational motion. Rotary solenoids of this type, for example, are known as rotational proportional solenoids that perform a rotational movement proportional to the current flow because of the current flow through the windings.

If the current flow through the winding of the coil conducting the current is switched off, the rotor is supposed to return in its starting position. For this purpose it is known in the state of the art providing a spring against the spring force of which the rotational motion is performed when the current is switched on, and the stored spring energy of which serves for resetting the rotor when the current is switched off. Employing appropriate return springs is often not convenient as assembling the springs requires additional space in the rotary solenoid. Furthermore, there is the risk that the return spring breaks and then the entire rotary solenoid fails. Just with rotary solenoids of small constructional dimensions assembling the filigree return spring is often very laborious and also prone to errors, what increases often the costs for manufacturing.

SHORT SUMMARY OF THE INVENTION

Referring to this state of the art, it is an object of the present invention to find an arrangement that avoids at least on of the before mentioned disadvantages.

In order to solve this problem the invention refers to a rotary solenoid as described in the beginning, and suggests the magnetic poles of the rotor disc, the air gap and the partial pole faces of the pole face form elements of the magnetic system of the rotary solenoid, and at least one element of the magnetic system is configured along the circumference, depending on the rotational angle of the rotor around the rotational axis changing in such a way that during switching-off the current through the windings of the coil, a torque results returning the rotor in the starting position.

The knack of the invention is the fact, that the additional structural component (a return spring) is deleted. The problem of providing a resetting torque is transferred to the anyway present elements of the magnetic system, and these are therefore used double. Such a configuration saves manufacturing costs in several ways, as an additional structural component is deleted, a spring is saved, and the rotary solenoid is constructed altogether smaller, while the other parameters remain the same. The invention here uses the fact that it as a basic tendency of a permanent magnet to short-circuit on the shortest way with lowest magnetic resistance. In other words, the movable system, that is the rotor equipped with permanent magnets, tries to take a position in the magnetic field with lowest (potential or magnetic) energy. The arrangement is here chosen cleverly such, that this energy is minimal when the displacement movement starts (that is in the starting position, rotational angle $\alpha=0°$), and thus the complete magnetic system has then a condition of lowest energy, when it is also in the completely reset position. The invention accomplishes this by the fact, that at least a (part) element of the magnetic system, seen in the direction of the circumference or rotational angle, is configured with reference to its magnetic effect or properties so inhomogenously or changeably that, when the current is switched off, the system that is on a higher energetic magnetic level can change immediately in the direction of low energy, and carries out a rotational movement in the starting position for this.

The rotor disc has, seen in the direction of circumference (and thus also depending on the rotational angle), alternating magnetically polarized magnetic poles configured as permanent magnets. These magnetic poles are also a part of the magnetic system. The magnetic properties are then designed in the direction of circumference or depending on the rotational angle of one, more or all elements of the magnetic system (partial pole face, magnetic pole and air gap) inhomogenously in such a way that in the starting position of the reset motion of the rotor defined by the applying of current in the winding, when the current is switched off, immediately a resetting torque is provided. Already a partial pole face or a magnetic pole is seen as element of the magnetic system. That means, in the configuration of the magnetic property of a partial pole face or a magnetic pole variable seen in the direction of circumference the effect according to the invention is already accomplished that, of course, is accordingly increased or multiplied when repeatedly used in other (part) elements.

Therefore, the term "element" cannot be interpreted restricted to a multitude of partial pole faces or magnetic poles.

For this it is provided, for example, that the interacting surfaces of the partial pole face or the surfaces of the magnetic poles can change, depending on the rotational angle of the rotor around the rotational axis, what is performed by a suitable design either of the partial pole face or the surface of the magnetic poles or by both. This can be accomplished by a design of the air gap arranged between the surface of the magnetic poles and the pole face depending on the rotational angle. It is another specific arrangement of an inhomogeneity in the magnetic system to vary the material of the permanent magnet forming the magnetic pole, for example to change the remanence accordingly by material exchange or change.

In a first suggestion the partial pole face is limited with reference to the rotational axis at least by an inside and/or outside arranged boundary edge running essentially in the direction of the circumference, and it is in particular suggested that at least one boundary edge runs spirally. The result of this suggestion is that the effective width (with reference to the rotational axis in radial direction) is changeable depending on the rotational angle of the rotor around the rotational axis, and thus also the magnetic system of the rotary solenoid varies depending on the rotational angle. The partial pole face is equipped, as it can be seen in particular in the drawing, at least with one outside and/or also inside arranged boundary edge, and it is sufficient, that at least one boundary edge runs accordingly spirally, wherein, of course, also both boundary edges can be designed accordingly. The boundary edge usually forms a circle segment. The term "spirally" has not to be interpreted here restricted to a concrete mathematical shape, but spirally is understood, according to this application, already as a course of the boundary edge where, depending on the rotational angle, the distance of a point on the boundary edge from the rotational axis each time has a changeable distance depending on the rotational angle.

In addition to the suggested principle of implementing a rotational angle-depending inhomogeneity in the magnetic system, another modification of the suggestion suggests that the boundary edge running essentially in the direction of circumference is linked to a border edge running essentially radial, and the border edge runs to the radial line, with reference to the rotational axis, tilted or diagonally or spirally or curved. Of course, it is also possible that the border edge runs radial. The result of an accordingly varied course of the border edge, however, is again a magnetic property of the partial pole face or the pole face changing with the rotational angle, that can be used cleverly for forming a resetting torque.

A preferred embodiment provides, that between the partial pole faces a pole gap is provided extending in radial direction with reference to the rotational axis. An appropriate design of the partial pole face, that is limited on the edge by a pole gap, makes it possible to control the rotational- or point-symmetric distribution of the magnetic field lines, that, as a rule, is the result when a coil is flown through by current, in such a way that the result is a distribution of the magnetic field lines differing from the rotational or point symmetry. The suggestion here uses the property, that through a suitable arrangement of soft-magnetic material guiding the magnetic field lines (for example suitable iron alloy and the like), a heterogeneous distribution of the magnetic field lines is the result. The invention does, of course, not exclude here, that, for example, connecting bridges present for manufacturing reasons between both partial pole faces bridge the pole gap; such (metallic or magnetically guiding) connections cause at the most a degrading of the efficiency, but does not fail the effect according to the invention.

Furthermore it is suggested, that the pole gap occurring between the two partial pole faces, is filled, for example, with a magnetically less active or inactive material, or the pole gap is configured as pole air gap.

It is equivalent for the invention, whether the occurring pole gap is filled or open. The used filling material, for example a polymer or the like, serves for connecting the partial pole faces closely to one another, in order to suppress a flux of the magnetic field lines, if possible, that is, to isolate here as good as possible.

The arrangement of the different partial pole faces is here realized such that there is, seen in the direction of circumference (with reference to the rotational axis) an alternating, magnetic polarization. Cleverly, here, for example, in a modification an arrangement is chosen where a first outer partial pole face encircles a second inner partial pole face. The first outer partial pole face is here, for example, part of a larger structural component in which then in a suitable way the second inner partial pole face is inserted. Cleverly, here a pole gap remains between these two partial pole faces. It is provided to use, for example, an axial symmetric configuration of the partial pole face. Thus at least one or a few symmetric axes are provided in the configuration of the partial pole face, in order to accomplish an appropriate homogenous behavior of the rotary solenoid (independently from its respective position).

For example, a suitably asymmetric design of the arrangements of the magnetic poles on the rotor disc serves for an inhomogeneous configuration of the magnetic system. However, it is also possible to configure the partial pole face asymmetrically in order to accomplish the purpose according to the invention.

According to the invention, the pole face is divided at least in two partial pole faces. These two partial pole faces, however, are also coplanar to each other, that means points on the first as well as on the second or all partial pole faces are on a common plane. In particular the surface facing the rotor disc is seen as partial pole face.

In a modification of the suggestion, the second, in particular inner partial pole face, seen in top view, is configured longitudinally extending. It is realized like a rectangle, wherein at the long sides in the end area appropriate (radial extending) widenings may be provided. The ratio of length to width of this partial pole face is here approximately 2:1, according to the invention it can be within an interval of 1.5:1 to 4:1. It is clear that the configuration of the inner but also of the outer partial pole face sets the magnetic property of the rotary solenoid. The invention comprises here modifications of the partial pole face with a two-piece symmetry (only symmetric with reference to two symmetric axes) as well as solutions with a four-, six-, or eight-piece (or even more) symmetry. The correspondingly more complex partial pole faces resulting from this than adapt themselves, if necessary, more to a curved outer shape. When the symmetry is two-pieced, the partial pole face is configured, for example, symmetrically longitudinally to its longitudinal axis and the transverse axis rectangular to it. Of course, the suggestion also comprises asymmetric modifications.

Another suggestion provides that the pole face has one or more inner and one or more outer partial pole faces. Usually, the partial pole faces are part of the stator, either of the center pole penetrating and holding the coil former, or of the housing the wall of which providing the connecting point for the outer partial pole face. Because of the number of the partial pole faces and also the number of the single magnetic poles, the range of the return movement, but also the resulting torque can be set accordingly. With a rather small number of inner and outer partial pole faces or magnetic poles here a range of 30 to 180° is realized for an effective range of the returning torque.

When the number of partial pole faces or magnetic poles is accordingly larger, this angle range is reduced. Usually an angle range of 45° to 180°, preferably of 45° to 130 or 150° is striven for and achieved.

For the design of the pole face several modifications are provided. Preferably, the center pole carries one inner partial pole face, in contrast to this one or more outer partial pole faces are arranged at the edge of the housing. Cleverly, the stator or parts of the stator is/are co-used for guiding the magnetic field, and thus the efficiency, for example the development of power, is considerably increased, wherein this guide of the magnetic field lines is not only employed for the case of electrifying the coil, but also when the current flow through the coil is switched off, and then the magnetic field of the permanent magnet, as described, is used for resetting the rotor.

Cleverly, different magnetic poles, that interact in a suitable way with alternating, magnetically polarized areas of the rotor disc, are assigned to the different partial pole faces.

In a modification of the invention, the stator is configured such that it surrounds or encircles the coil, and serves as housing. As the coil is designed rotational symmetric, in particular cylinder-shaped, also the stator has a basically cylinder-like or pot-like shape. The arrangement is here, if necessary, chosen such that the stator is supported for guiding purposes on the outside and/or inside of the coil. It is in particular provided in a modification according to the invention, that the stator has an in particular mandrel-like center pole penetrating the coil and carrying the second inner partial pole face. The arrangement is here chosen such that the center of gravity of the second inner partial pole face gets to rest on the rotational axis. The result is here an arrangement of the inner, second partial pole face as exactly centric as possible.

According to the invention it is provided, that the stator serves for the guide of the magnetic flux of the magnetic field generated by the winding of the coil by applying current, and is manufactured preferably of soft magnetic iron. Instead of the soft magnetic iron, according to the invention, all other materials can be employed that serve perfectly for a guide of the magnetic flux. As it can be concluded, in particular from the drawing (in particular from FIG. 1), the stator is configured pot-like with a center pole arranged centrically or coaxially. Exactly the outer area encircling the coil is cleverly used for guiding the magnetic field, so that the efficiency of the entire arrangement is increased considerably. As such an arrangement is otherwise not known in the state of the art, this measurement accomplishes a surprising advantage where the stator now is not only assigned the fixed function of a rotating arrangement, but it takes over additionally the function of guiding the magnetic field as well as a function of a housing.

A modification provides, that the stator is configured of several pieces, and receives at least one jacket part of the coil, and a lid part is connected to the jacket part and seals it. The multi-piece construction makes it possible to insert the coil in a first part, the jacket part, and to seal it by a second part, the lid part. The two parts are pressed together, for example, or caulked, and thus connected to each other for a perfect guide of the magnetic flux. Besides these mechanic connecting processes, of course also other methods for connecting can be used according to the invention. These are, for example, connecting by means of a screw connection or welding, gluing or soldering. In addition to the here described two-piece configuration of the stator, it is, of course, also possible to realize the stator by several structural components, for example three or four components. A multi-piece design may have, in particular, constructional reasons and advantages.

Cleverly, the arrangement is chosen such, that the stator forms a partial pole face, wherein this (first, outer) partial pole face is arranged in particular in or at the lid part. It is provided here, that the stator, in particular the lid part, has in the area of the first partial pole face a recess for receiving the second partial pole face, and, for example, the contour of the recess corresponds with the contour of the second partial pole face, wherein at least partly a pole air gap extends between both partial pole faces.

The invention also comprises the fact, that the stator receives several partial pole faces in a suitable way. In particular, the invention extends to modifications comprising three, four or even more single partial pole faces. Of course, here a partial pole face with the stator or a part of the stator (for example the lid part) can be designed in one piece.

It is convenient, when, for fastening purposes, at the lid part at least one fastening opening is provided. The fastening opening is arranged, for example, in a flange-like projection.

An advantageous embodiment provides, that the rotor disc carries on its side facing the coil at least one ring of magnetic poles configured as permanent magnets. This ring of permanent magnets consists here of a larger number of permanent magnets that are equivalent with regard to their dimensions as well as to their remaining magnetization. The single permanent magnets are arranged, for example, in a ring (with constant radius) the center of which is on the rotational axis, so that preferably an arrangement of single ring sectors with identical length is the result. If the single permanent magnets also have identical magnetization, also the course of the magnetic field lines in the area of the single sectors is at least approximately identical. The arrangement is here chosen such, that the result is an alternating polarization, i. e. an alternating arrangement of magnetic poles in the direction of circumference (with reference to the rotational axis of the rotor disc).

It is possible, that the respective magnetic poles are configured as ring segments of identical or different size. If, in particular, the ring segments have different sizes, this can influence the magnetic system in a suitable way. Besides the configuration of the magnetic poles as parts of a ring segment with a generally constant inner and outer radius, it is, however, also possible to vary the design of the magnetic poles. Thus it is provided, that the magnetic pole is limited by magnetic pole boundary edges located with reference to the rotational axis inside or outside, extending essentially in the direction of circumference, as well as that the magnetic pole boundary edges are connected by magnetic pole border edges. It is possible here that at least one (if necessary, also both) magnetic pole boundary edge extends spirally. The term "spirally" has to be understood here as described above. If necessary, also, for example, a crescent-shaped design of the pole faces is possible.

For that it is convenient and advantageous, if the magnetic pole border edge runs radial with reference to the rotational axis, essentially radial or tilted to the radial line (with reference to the rotational axis), or diagonal or spirally or curved. This also accomplishes, that the magnetic properties, in particular the shares of different polarities, are varied accordingly, what is favorable for executing a resetting torque.

The suggestion according to the invention comprises solutions where the single magnetic poles are arranged closely one next to the other or are spaced from each other.

Another advantageous suggestion according to the invention provides that the material for the permanent magnets of the magnetic pole is configured such, that its remanence can change depending on the rotational angle of the rotor. In another modification for realizing the principle according to the invention, the magnetic property of the material of the permanent magnet connecting in the magnet is multiplied specifically. This also makes it possible to accomplish inhomogeneity in the magnetic system what serves for effecting a resetting torque.

In another embodiment of the invention the length of the inner, second pole face corresponds essentially with the radius of the ring of magnetic poles/permanent magnets. It has already been described that through the arrangement of the partial pole faces, in particular the inner partial pole face, a heterogeneous distribution of the otherwise homogeneous, point- or rotational symmetric distribution of the magnetic field lines of a coil flown through by current results. In the suggestion according to the invention, to approach the length of the second (inner) partial pole face essentially to the radius of the ring of permanent magnets, the result is a concentration of the magnetic field lines exiting the coil in the radial range of the permanent magnets, and therefore a corresponding development of power. It is convenient here, that the (second) partial pole face is configured preferably extending longitudinally, rectangle-like. A rectangle-like configuration is in particular a shape as it is shown in particular in FIG. 2a.

A preferred embodiment provides that the respective sum of the areas of the surface parts of the magnetic poles facing the air gap with respectively identical polarity, wherein the surface parts are defined by the fact, that they, seen in the direction of the rotational axis, are located on the partial pole faces, can change depending on the rotational angle of the rotor. This describes, that the surface parts of the magnetic pole opposite the partial pole faces, seen in the direction of the rotational axis, i. e. not positioned above a pole gap, are not identical along the entire rotational movement of the rotor, but are different. The respective surface parts of identical polarity have to be summed up here to a sum of the areas. Because of the heterogeneous design either of the magnetic poles or the partial pole faces, the sum of the areas along the rotational angle or seen in the direction of the circumference is not constant, but differs. This fact goes here for both polarities, that means both north and south poles, respectively, present at the two permanent magnets/magnetic poles.

Furthermore it is provided, that the respective sums of the areas of the surface parts with each time the same polarity are different. Here the sum of the areas of the surface parts of the magnetic poles with each time identical polarity, where the surface parts seen in the direction of the rotational axis are on the partial pole faces, is added up. This sum of the areas is determined for the north as well as for the south poles. As these sums of the areas are each time different, that means unbalanced, a certain share of the magnetic field lines results in a magnetic force that leads to a resetting moment of the rotor in the rotational axis, when the current flow through the windings of the coil of the rotary solenoid is switched off.

Furthermore it is convenient for developing a torque resetting the rotor, that the difference of the respective sums of the areas of the surface parts with each time identical polarity can change depending on the rotational angle of the rotor. Referring to the completely turned position of the rotor, that has been executed after an appropriate application of current on the magnetic coil, the result is a maximum difference of the respective sums of the areas of the surface parts with identical polarity. When the displacement or rotational angle decreases (the starting position, when current is applied, is the starting angle α=0), preferably also this difference is reduced, however, it depends on the rotational angle of the rotor. This rather large unbalance in the starting point of the return movement results in a magnetic force in the direction of rotation that favors the forming of the resetting torque.

Besides this effect, there is another effect, namely that through a radial extending boundary edge also a magnetic force results that supports the torque. This is deduced from the areas of the surface of the magnetic pole that is not on the partial pole face, seen in the direction of the rotational axis. It has also to be taken into consideration here, that the magnetic flux always chooses the way of the least magnetic resistance, and thus the way with the smallest air gap to the single partial pole faces. The result is here a generally constant power in the direction of rotation, and thus a constant part of the resetting torque.

In this connection special attention should be paid to the fact that the variation in the magnetic system, seen in the direction of circumference or in the direction of the rotational angle, can be executed in the configuration of the partial pole faces as well as in the configuration of the magnetic poles. The knack is, in particular, that the parts of the sums of areas of the surface parts with identical polarity each time are different, and thus a resulting magnetic force consists of a certain part of the magnetic field lines in the direction of reset.

There are several modifications for the configuration of the air gap that occurs, on the one hand, between the rotor disc and the magnetic poles, and, on the other hand, the pole face or the partial pole faces. First, it is provided that the air gap in axial direction (with reference to the rotational axis) between the pole face and the rotor disc along the pole face is the same all over, and an appropriate inhomogeneity in the magnetic system is realized by the configuration of the pole face or the partial pole face, on the one hand, and/or the magnetic pole or the surface (parts) of the magnetic poles, on the other hand. At least, it is also possible, that the partial pole faces are orientated each time coplanar to one another. However, these parameters can also be varied in order to achieve the effect according to the invention. For example, it is possible, that the single partial pole faces are slightly shifted with reference to the rotational axis, that means they are not arranged coplanar, or the air gap, seen in the direction of rotations, is not constant but changes.

By clever dimensioning the air gap between the pole face and the rotor disc, and the pole gap between the single partial pole faces, the behavior of the rotary solenoid is characterized and perfected, respectively. Thus it suggested, for example, that the air gap in axial direction, with reference to the rotational axis, between the pole face and the rotor disc is smaller than the pole gap. Such a configuration "forces" the magnetic field lines exiting at the partial pole face to penetrate primarily in the material of the rotor disc, and to seek via this the magnetic circuit to the other partial pole face. When the distances are dimensioned cleverly, as described, this behavior is controlled.

It has been found here in particular to be even more convenient to choose the sums of the width of the air gap and the thickness of the ring of permanent magnets smaller than the size of the pole gap.

Another modification provides, that the entire pole face is coplanar, that means no elevations or elevated sectors and so on facing the rotor disc are provided on the pole face. Thus a perfected short construction in axial direction is accomplished.

Alternatively, it is provided that the width of the air gap can change depending on the rotational angle of the rotor. This makes it possible to vary the magnetic system accordingly for forming a resetting torque. This can be realized, for example, by the fact that at least one partial pole face or even more or all partial pole faces is/are tilted or curved or tipped in such a way to a reference plane vertically to the rotational axis, that the width of the air gap changes depending on the rotational angle of the rotor.

As the air gap is limited, on the one hand, by the pole face or partial pole faces, on the other hand, by the rotor disc or the magnetic poles, it is also possible that at least a surface of a magnetic pole is tilted, curved or tipped to a reference plane vertically to the rotational axis, so that also the result is a variation of the width of the air gap depending on the rotational angle of the rotor.

Preferably, a cover disc, that is in particular magnetically low active or inactive, is linked to the rotor disc on the side opposite the coil. The material used for the cover disc is, for example, stainless steel (V2A), aluminum or even a synthetic material or composite material. A low magnetic activity is harmless for the effect according to the invention as the resulting lost scatterings do not prevent the effect according to the invention.

The arrangement of the coil that is coaxial with reference to the rotational axis. The coil, configured preferably as a cylinder-shaped coil (with a circular cross section), is orientated coaxial to the rotational axis with reference to its longitudinal or center axis, that means the longitudinal axis of the coil guides together with the rotational axis of the rotor. Also the use of a coil former or a coil with an elliptic base or an elliptic cross section is possible. The advantage of such a configuration is the fact, that here there is already a tendency to a heterogeneous magnetic field distribution in the interior of the coil, an elliptic coil former can be covered conventionally with the windings, and here also an arrangement is possible where the rotational axis runs within the elliptic coil former, i. e. it is constructed very space saving.

It is clear, that the suggestion thus is not restricted only to rather simple, regular coil formers. For example, coils or coil formers can be employed that are realized such, that the applied windings encircle after that the rotational axis, and, for example, still can be manufactured in a simple way, even if their coil formers are rather complex (multi-edged, polygonal or the like).

Another modification provides, that at least one partial pole face is held by the coil former of the coil. This improvement according to the invention refers to the inner partial pole face as well as to the outer partial pole face. This means, that the partial pole faces are not held compulsorily either by the center pole or be part of the stator. In another arrangement of the construction it is actually clever to use the coil former, that is provided anyway for forming the coil, also as fastening point for the partial pole faces.

BRIEF DESCRIPTION OF THE DIFFERENT VIEWS OF THE DRAWINGS

In the drawing the invention is shown schematically, in particular by means of an example. In the figures:

FIG. 4 is a top view of another embodiment of the rotary solenoid according to the invention, with dismounted rotor, similar to the view in FIG. 2a.

DETAILED DESCRIPTION OF THE PREFERRED EMBODIMENT

In the figures identical or corresponding elements are referred to each time by the same reference numbers, and therefore are, if not useful, not described anew.

Figure 1:
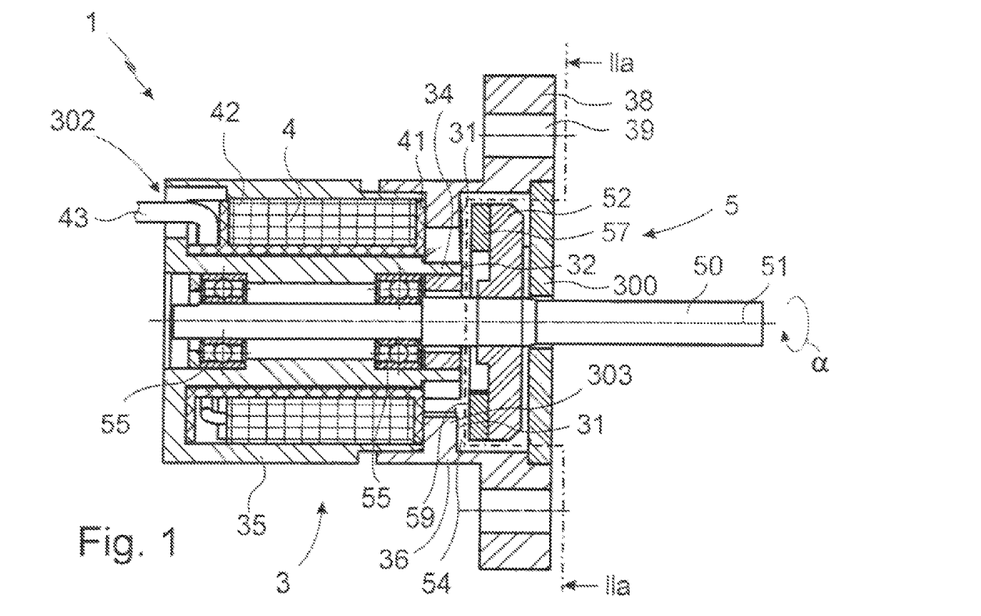
FIG. 1 is a section through a rotary solenoid according to the invention.

The rotary solenoid 1 is shown in FIG. 1 schematically in a sectional representation. The rotary solenoid 1 essentially consists of a stator 3 and a rotor 5. The stator 3 receives the coil 4, the rotor 5 revolves around the rotational axis 51.

In the embodiment shown here the stator 3 consists of two parts, namely the jacket part 35 and the lid part 36. The jacket part 35 is designed pot-like and receives the coil 4. At the same time, in particular the jacket part 35 acts as housing and seals the rotary solenoid.

The outer shape of the jacket part 35 is here pot-like, wherein concentrically a center pole 34 is provided mandrel-like, on which the coil former 41 of the coil 4 can be put. At the inner side of the center pole 34 two swivels 55, slightly spaced from each other with reference to the rotational axis 51, are provided, that support the rotor shaft 50 of the rotor 5 radial in the stator. Seen in axial direction, the center pole 34 projects over the end of the coil 4 in the direction of the lid part 36. Thus it provides a mandrel-like put-on function; the center pole 34 is arranged coaxially to the rotational axis 51.

Coil 4 is formed of an essentially cylinder-shaped coil former 41 carrying the windings 42. The windings 42 consist of a current-conducting wire. The windings are arranged on the coil former 41, the coil former 41 and thus also the windings 42 are arranged such in the stator 3 that they encircle the rotational axis 51.

On the side of the stator 3 opposite the lid part 36 in the range of the floor 302 a penetration for the connection cable 43 of the windings 42 is provided.

In the example shown here, in the stator 3 only one coil 4 is provided, however, without restricting the invention to this. According to the invention it is possible to arrange also several coils 4 axial with reference to the rotational axis 51 one behind the other each time coaxially on the rotational axis 51. The stator 3 is then accordingly longer.

The multi-piece construction of the stator 3, divided in a jacket part 35 and a lid part 36 makes mounting of the rotary solenoid 1 according to the invention considerably easier. When the lid part 36 has been removed, it is possible to assemble the coil 4 in the jacket part 35, in particular to slid it on the center pole 34. The center pole 34 is configured sleeve-like and hollow on the inside, in order to receive the rotor shaft 50. Also a swivel 55 is inserted and, if necessary, pressed in, in the center pole 34; for that an appropriate collar is provided in the center pole 34.

The lid part 36 is slid in axial direction (with reference to the rotational axis 51) on the jacket part 35 and pressed together with it. In the example of the rotary solenoid shown here a collar 303 of the lid part 36 projecting inwards forms the pole face 30 or a part of the pole face 30 or the partial pole face 31.

The stator 3 serves for guiding the magnetic field generated by the coil 4, when current is applied on the windings 42 carried by the coil 4. The connection between the jacket part 35 and the lid part 36 is designed such that a conduction of the magnetic flux is not impeded, if possible.

The lid part 36 has the function of providing a fastening means of the rotary solenoid 1 according to the invention. For this, a fastening flange 38, projecting preferably on both sides, is formed at the lid part 36 having fastening openings 39 through which suitable fastening screws (not shown) can be guided.

The rotor 5 has a rotor shaft 50 that is approximately 1.5 to 3 times, preferably approximately 1.8 to 2.2 times longer than the length of the stator 3. In the center the rotor shaft 50 carries the rotor disc 52. The area of the rotor shaft 50, that projects in the stator and in which both swivels 55 are supported, is connected to it, shown in FIG. 1 on the left hand side.

To the part of the rotor shaft 50 (shown in FIG. 1 on the right hand side) projecting outwards, beyond the stator 3, accordingly elements can be connected that can be controlled because of the rotational movement of the rotary solenoid 1. For this, the rotor shaft 50 penetrates a cover disc 300 covering the rotor disc 52.

In the example shown here, the rotor disc 52 carries a ring 53 (FIG. 2b) of magnetic poles 57a permanent magnets, the pole arrangement of which, however, is chosen such that it is changing in the direction of circumference 10 (with reference to the rotation of the rotational axis, around the rotational axis 51), i.e. alternating.

Because of the current flow through the windings 42 of the coil 4, a torsion or displacement of the rotor shaft 50 around the rotational axis 51 by a displacement or rotational angle α is executed. The terms "rotational angle" or "displacement angle" are equivalent.

The magnetic system of the rotational magnet 1 is defined, in particular, by the partial pole faces 31, 32 of the pole face 30, of the magnetic poles 57a, 57b, 57c, 57d and the air gap 54 running between these two elements, essentially axially. It has to be taken into consideration here that the magnetic pole 57 limits through its surface 59 the air gap 54.

Figure 2A:
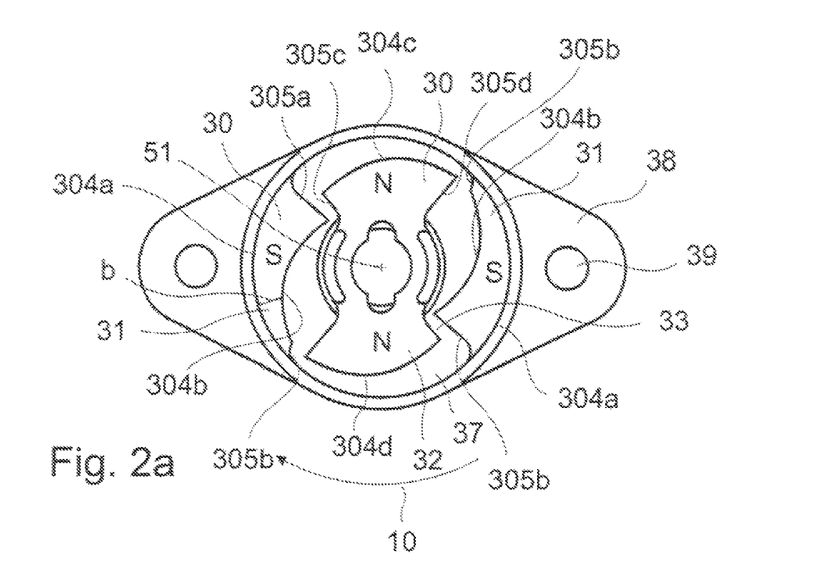
FIG. 2a is a top view of a rotary solenoid according to the invention, according to the section line IIa-IIa in FIG. 1 with dismounted rotor.

FIG. 2a shows a top view of the rotary solenoid 1 according to the invention, with the rotor 5 removed.

The pole face 30 is in the embodiment shown here divided in two partial pole faces 31, 32. The inner pole face 32 is constructed on the center pole 34 of the stator 3, and is limited by an outer boundary edge 304c (top) and 304d (bottom) in the direction of circumference 10. In the example shown here the (inner) partial pole face 32 is enclosed, at least partly, by two opposing outer partial pole faces 31.

The arrangement of these partial pole faces 31, 32 has the effect that the well-known point- or rotational-symmetric distribution of the field lines for a magnet coil is blurred during the configuration of the single partial pole faces 31, 32. The partial pole faces serve for guiding in the magnetic field lines. N or S indicate the magnetic poles of the magnetic field generated by the coil. It is convenient here, that a pole gap 33 exists between the partial pole face 32 enclosing also the rotational axis 51, and the laterally spaced partial pole faces 31, 31a, 31b. Optionally, the pole gap 33 is filled or not filled. This pole gap 33 is an appropriate resistance for the magnetic field lines.

Thus, an alternating arrangement of north (N) and south (S) poles, respectively, forms on the pole face 30 in the direction of circumference, seen with regard to the rotational axis 51.

The construction of the arrangement is solved such that the lid part 36 has a recess 37 in which the inner second partial pole face 32 can be set. Seen in detail, here the inner second partial pole face 32 is put on, pushed on or pressed on the mandrel-like end of the center pole 34. Besides a good mechanic seat thus the partial pole face receives also a good magnetic contact to the rest of the center pole 34.

The arrangement is here chosen such that the surface of the partial pole face 31, 32 facing the rotor disc 52 are coaxial to one another, that means the distance from the pole face 30 divided in several partial pole faces 31, 32 to the rotor disc 52 is the same everywhere, so that an air gap 54 with constant width between the pole face 30 and the rotor disc 52 or the ring 53 arranged on the rotor disc 52 from the permanent magnet with identical dimension is the result.

As it can be seen clearly in FIG. 2a, the pole gap 33 runs in radial direction (with reference to the rotational axis 51). The pole gap 33 is here located, seen in the direction of circumference, between the first partial pole face 31 and the second partial pole face 32.

The configuration of the second inner partial pole face 32 is like a rotating armature, however, seen in top view slightly distorted, that means square- or parallelogram-like, wherein the partial pole face 32 has to be distinguished in three areas. In a center area having an opening for guiding through the rotor shaft 50, the partial pole face 32 is restricted by a circular-arc segment concentric to the rotational axis 51.

The two outer areas opposite each other, that are linked to the center area, have approximately the same size and are slightly distorted clock-wise 10 for generating inhomogeneity in the magnetic system.

Seen clock-wise, first a shorter first border edge 305c and consequently a longer second border edge 305d, that is ori-entated essentially radial without limiting the configuration to it, are linked the top boundary edge 304c as well as to the bottom boundary edge 304d.

As the two border edges 305c, 305d have a length running differently radial or approximately in radial direction, the result is, that the entire boundary edge 304c, 304d does not run equi-distantly to the rotational axis 51, but the single points have different distances to the rotational axis 51, that means they are guided crescent-like or spirally clock-wise from the inside to the outside.

The outer partial pole face 31 also has boundary edges 304a, 304b and border edges 305a, 305b, respectively, leading to a particular distribution of the magnetic field lines, when the rotor is displaced. The border edges 305a, 305b are rather short. Their length is only about 5% to 50%, preferably about 8% to 20% of the length of the boundary edge 304a, 304b, or 5% to 50%, preferably 10% to 40% of the exterior radius of the ring 53 of the magnetic poles 57. The border edge 305b is curved, and, in particular not directed in radial direction but diagonally to it, wherein a straight line defining the border edge 305b covers an angle of 50° to 80°, about 60° with a radial line.

Figure 4:
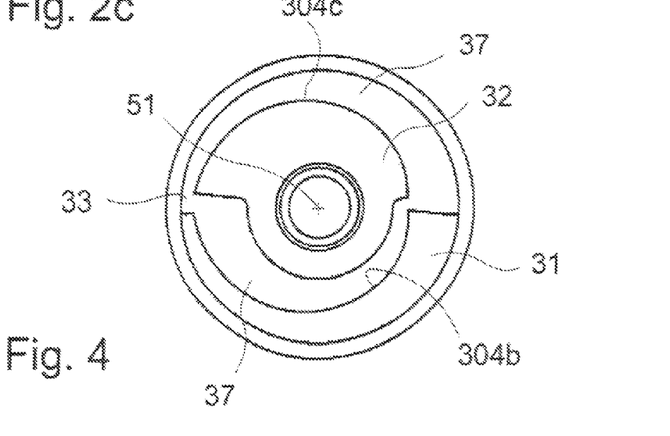

FIG. 4 shows an alternative configuration of the pole face 30. If the configuration according to FIG. 4 is compared with the modification according to FIG. 2a it can be seen that instead of two outer partial pole faces 31, between which the inner partial pole face 32 (FIG. 2a) is arranged, in FIG. 4 only one inner partial pole face 32 and one outer partial pole face 31 is provided each time. The arrangement is here chosen such that the pole face is divided in two halves of approximately identical size, and each half receives a rest of a partial pole face. Thus the inner partial pole face 32 extends in the top area of the pole face, the outer partial pole face 31 extends in the lower area of the pole face with reference to the rotational axis 51. For fastening and stability reasons a support ring of the partial pole face 32 projects in the lower half in which mostly the outer partial pole face 31 is arranged. Seen clockwise the course of the outer boundary edge 304c of the inner partial pole face 32 is spiral from the outside to the inside, in contrast to that the course of the inner boundary edge 304b of the outer partial pole face 31 (seen clockwise) is spiral from the inside to the outside. The arrangement is here chosen such that at least a part of the points of the inner boundary edge 304b of the first partial pole face 31 has less distance from the rotational axis 51 than at least a part of the points of the outer reference edge 304c of the second partial pole face 32. The suggested configuration realized over a rather large resetting angle range (130°, 160° or even 180°) a resetting function. The particular course of the reference edges results, for example in connection with a magnetic pole configured as ring segment, accordingly favorable reactions in the occurring resetting torque. It is, of course, possible to employ a similar geometric system also or only when the magnetic poles are configured.

The arrangement is such that the outer boundary edge 304a has a constant radius with reference to the rotational axis 51. The inner boundary edge 304b is, seen clockwise, first guided from a larger radius to a smaller radius in such a way that the effective width b (measured radial) in the direction of circumference 10 (seen clockwise) enlarges, and this is over an angle range of more than 1°, preferably more than 5°, in particular more than 10°. The share of the surfaces of the two partial pole faces 31, 32 altogether are not the same, in particular below the ring 53, so that a certain part of the magnetic field lines results the magnetic force of which generate a resulting torque.

The arrangement is here chosen such that the outer partial pole face 31 extends over an angle range (around the rotational axis 51) of approximately 90°. It is clear that not only two outer partial pole faces 31 can be arranged, as FIG. 2a shows, but the number can be defined variably and be even larger. The inner partial pole face can be formed, for example, star-like that beams of which project between the outer, single partial pole faces 31. It is possible to provide only one outer partial pole face 31, as it is shown for example in FIG. 4. The outer partial pole face 31 can have here an angle range of at least 10° up to, for example, 180°, preferably of 15° to 120°, wherein the respective length of the partial pole faces does not have compulsorily the same size, it can be different.

The inner partial pole face 32 shown in FIG. 2a has an angle segment of two times each time approximately 78°, that is arranged on both sides of the rotational axis 51.

In the example shown here the pole gap 33 is about 12°, it also can be chosen accordingly larger or smaller, and, for example, be within an interval of 5° to 25°, preferably 8° to 14°.

Figure 2B:
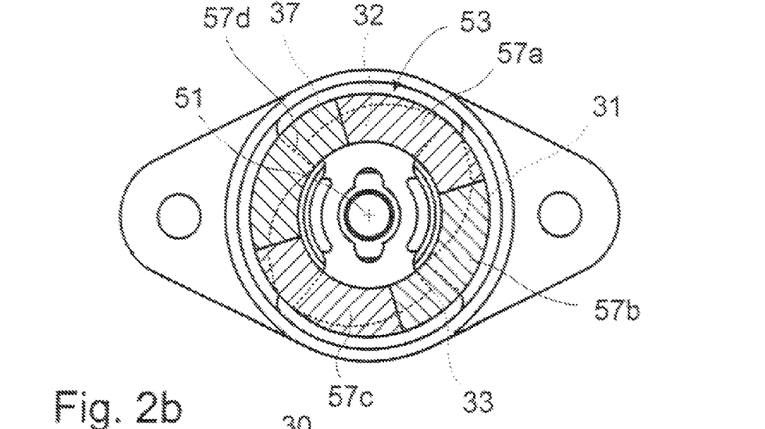
FIGS. 2b, 2c, 2e are each in a top view (similar to FIG. 2a) the rotary solenoid according to the invention each time in the final position, after the re-rotating movement of the rotor, with rotor disc with magnetic poles covering the pole face.
Figure 2C:
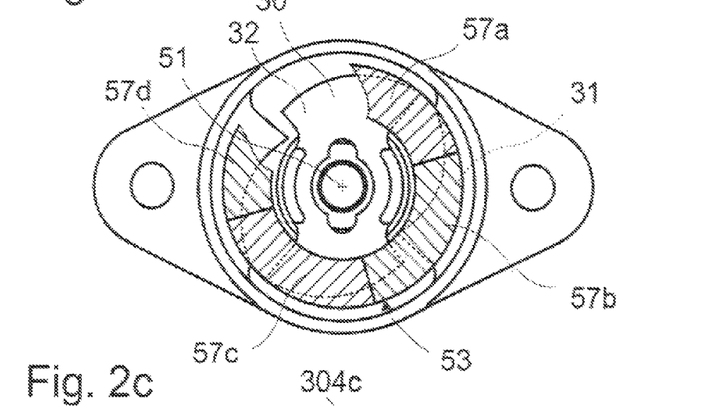

FIG. 2b and FIG. 2c show additional views that are supposed to serve for simplifying the chosen view.

Thus, FIG. 2c shows in particular a ring 53 with the different magnetic poles 57a, 57b, 57c, 57d partly broken open such that the partial pole face 32, otherwise covered by the ring 53, and the recesses 37 can be recognized.

The presentation according to FIG. 2b is somewhat more complex, where the elements actually covered by the ring 53 with the magnetic poles 57a, 57b, 57c and 57d are executed by dashed reference lines, and thus are supposed to make clear that they have to be seen in a somewhat lower position, more arranged in the stator 3.

Figure 2D:
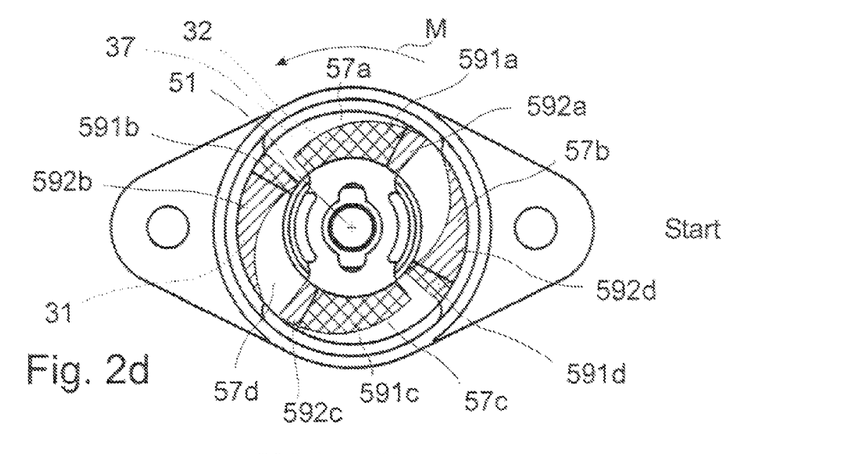
FIG. 2d is in a top view the rotary magnet according to the invention in the starting position [START] that leads to the final position [ENDE] according to FIG. 2e.
Figure 2E:
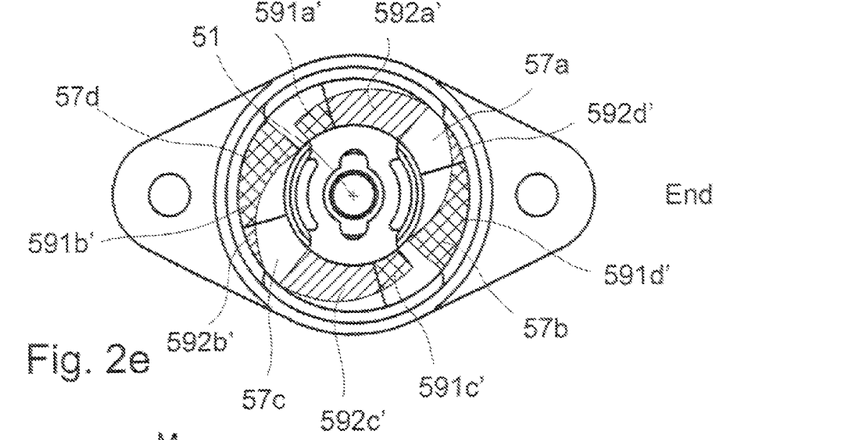

FIG. 2d and FIG. 2e show two positions of the rotary solenoid according to the invention, wherein in FIG. 2d the START position (α=αMax) shows what corresponds with the moment when the current flow through the windings of the coil 4 is switched off and the rotor is in the completely displaced angle position.

FIG. 2e shows the end position (ENDE) of the rotor, after the resulting torque M has swiveled the rotor back in its starting position (α=0°).

FIGS. 2d and 2e, respectively, show in different hatch techniques each time homogeneously polarized surface parts 591a, 591b, 591c, 591d and 592a, 592b, 592c, 592d, respectively of the respective magnetic poles 57a, 57b, 57c, 57d.

For simplification reasons it has to be assumed that the lozenge-like hatched surfaces 591a, 591b, 591c and 591d are polarized as south poles (S), and the surface parts 592a, 592b, 592c and 592d that are only diagonally hatched are N-polarized.

As it can be seen without any problems in FIG. 2d, the surface part 591a, for example (as an example for all other surface parts), describes the range of the magnetic pole 57a that is, in the direction of view of the rotational axis 51, as also shown in FIG. 2d, exactly on the top part of the inner partial pole face 32.

The surface part 591b is the share of the magnetic pole 57a that rests on the outer partial pole face 31 arranged on the left hand side.

The areas of the single magnetic poles 57a, 57b, 57c, 57d that are not hatched, are above the open recess 37.

The surface part 592b describes the area of the magnetic pole 57d, that is above the crescent-like rest part of the left partial pole face 31.

Connected clockwise to the surface part 591a, after the boundary to the next pole face 57b, the partial pole face 592a is located, that is, similar to the surface part 592c, marked as N-pole.

The conditions for the other surface parts 591c, 591d, 592d are an analogous consequence of the basically point symmetric configuration.

It has to be taken into consideration, that here the surface parts 591a, 591b, 591c, 591d and 592a, 592b, 592c, 592d, respectively are each time the parts of the surface 59 of the single magnetic poles 57a, 57b, 57c, 57d facing the air gap 54.

If the areas of the single, equally polarized surface parts are added, the result will be in the picture shown in FIG. 2d for the S-polarized surfaces, for example a value of 7.828 area units, for the N-polarized surface parts 592a, 592b, 592c, 592d a value of 6.151 surface units.

Thus it has to be stated that in the (completely) displaced position according to FIG. 4 an actually considerable unbalance of the respective polarized area sums is the result. The difference of the N- and S-polarized surface parts is actually 1.677 surface units.

FIG. 2e shows the end position with a rotational angle of α=0°. It can be seen clearly, that the single surface parts 591a, 591b, 591c, 591d and 592a, 592b, 592c, 592d, respectively, are located, on the one hand, now at another place, and, on the other hand, also have different sizes. This fact is now indicated by adding 0 each time, and it can be seen clearly that, for example, the shares of the surface part 591a are reduced from FIG. 2d to the share of the surface part 591a' in FIG. 2e, in contrast to this, for example the share of the surface part 592c in FIG. 2d has increased considerably to 592c' in FIG. 2e.

If now again the sums of the areas of the single equally polarized surface parts for the N- and S-polarized sums, respectively, are added, the result is for the S-polarized surface a surface of 7.191 surface units, for the N-polarized Surfaces a total surface of 6.884 surface units. It can be seen clearly, that between these two positions of rotational angle, on the one hand, the S-polarized surface is reduced, on the other hand, the N-polarized surface shares have increased, and also the difference of N- or S-polarized surfaces is considerably reduces, namely to a value of 3.357 surface units.

Figure 3:
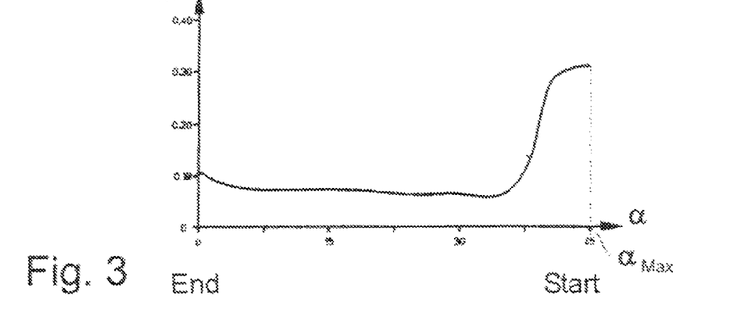
FIG. 3 is the resetting torque as function of the rotational angle α, or the displacement angle according to the invention.

The graphic chart according to FIG. 3 impressively the resulting effects on the resetting moment M. Here the resetting moment M is shown, when no current is applied, wherein the start of the return movement of the rotor displaced by a certain angle α=αMax is shown on the left hand side, the end of the return movement is provided at an angle α=0°. The return movement starts with a rather high starting torque that is on a constant level over a range of approximately 5-8°, and then decreases slightly. The farther the displacement angle α is reduced, the more decreases the resulting return moment, however, this does not become 0, but remains at least on a basic torque that corresponds with about a third of the starting return moment.

The high value of the return moment at the beginning is a result of the high asymmetry of the N- or S-polarized surfaces, and the high difference of these surface parts, respectively. It has to be emphasized that this particular course of the characteristic is not the characteristic result of a proportional magnet, but in the same way can be realized, for example, also with a switching magnet. The high value of the return moment at the beginning at START is favorable in that respect that adhesion of the system can be overcome fast and lasting.

The essentially constant return moment is the result of the effect of the areas of the surface of the magnetic pole 57 that is, seen in the direction of the rotational axis 51, not on a partial pole face 31, 32.

This permanent magnetic field is orientated to the next border edge and generates a rotational angle independent magnetic power share in longitudinal radial direction (with reference to the rotational axis 51) what results from this constant torque share.

Although the invention has been described by means of exact examples that have been illustrated to the very detail, it is pointed out, that this serves only for illustration and that the invention is not necessarily restricted to it as alternative embodiments and methods will become clear for those skilled in the art with respect to the disclosure. Accordingly changes can be considered that can be performed without deviating from the contents of the described invention.

What is claimed is:

1. Rotary solenoid, comprising:
a stator and a rotor that can rotate around a rotational axis, wherein the rotor has a rotor shaft on which a rotor disc is arranged, and the rotor disc has, seen in the direction of the circumference, alternating magnetically polarized magnetic poles, and the stator receives at least one coil carrying windings of wire conducting electric current, and the windings encircle the rotational axis, and between the coil and the rotor disc a pole face is provided consisting of at least two partial pole faces, including a first partial pole face and a second partial pole face, serving for guiding the magnetic flux of the magnetic field generated by applying current to the windings of the coil, whereby there is at the pole face a magnetic polarization alternating with reference to the rotational axis seen in the direction of the circumference, and between the rotor disc and the pole face an air gap is provided, wherein the magnetic poles of the rotor disc, the air gap and the partial pole faces of the pole face form elements of the magnetic system of the rotary solenoid, and at least one element of the magnetic system is configured along the direction of the circumference, depending on a rotational angle of the rotor around the rotational axis changeably in such a way that during switching-off the current through the windings of the coil a torque results resetting the rotor in the starting position, wherein each partial pole face has an inside and/or outside arranged boundary edge running in the direction of the circumference, the boundary edge describing a circle segment with a course of the boundary edge where, depending on the rotational axis, the distance of a point on the boundary edge from the rotational axis has each time a distance changing depending on the rotational angle.

2. Rotary solenoid according to claim 1, wherein at least one boundary edge runs spirally.

3. Rotary solenoid according to claim 1, wherein the boundary edge running in the direction of the circumference is linked to a radial running border edge, and the border edge runs, with reference to the rotational axis, tilted or diagonally or spirally or curved to the radial line.

4. Rotary solenoid according to claim 1, wherein a pole gap is provided, and the pole gap is arranged between the partial pole faces, wherein the pole gap extends in a radial direction with reference to the rotational axis.

5. Rotary solenoid according to claim 1, wherein at least one of (a) the stator has a mandrel-like center pole that penetrates the coil and carries the second partial pole face, and (b) the stator has a lid part, and the lid part has in the area of the first partial pole face a recess for receiving the second partial pole face, wherein at least partially a pole gap extends between the first partial pole face and the second partial pole face.

6. Rotary solenoid according to claim 1, wherein a pole gap is provided, and the pole gap is one of (a) filled with magnetically low active or inactive material, and (b) defines a pole air gap.

7. Rotary solenoid according to claim 1, wherein the first partial pole face is an outer pole face, the second partial pole face is an inner pole face, and at least one of (a) the first outer partial pole face encircles the second inner partial pole face at least partly, and (b) at least one first outer partial pole face defines a crescent-shaped.

8. Rotary solenoid according to claim 1, wherein at least one of (a) the pole faces has one or more inner and one or more outer partial pole face/s, and (b) the pole face has exactly one inner and exactly one outer partial pole face, and the pole face is divided in two halves with approximately the same size, and in each half a majority part of a partial pole face is arranged.

9. Rotary solenoid according to claim 1, wherein the first partial pole face has a boundary edge arranged inside and the second partial pole face has a boundary edge arranged outside, and at least a part of the points of the inside arranged boundary edge of the first partial pole face has less distance from the rotational axis than at least a part of the points of the outside arranged boundary edge of the second partial pole face.

10. Rotary solenoid according to claim 1, wherein the first partial pole face is an outer pole face, the second partial pole face is an inner pole face, and a center pole is provided, and the inner partial pole face that is connected with the center pole is arranged between two outer partial pole faces, and the partial pole faces are coplanar.

11. Rotary solenoid according to claim 1, wherein the rotor disc carries on a side facing the coil at least one ring of magnetic poles configured as permanent magnets, and wherein the magnetic poles are configured as ring segments.

12. Rotary solenoid according to claim 1, wherein on the rotor disc the magnetic pole is limited by magnetic pole boundary edges located with reference to the rotational axis, running in the direction of the circumference, and also the magnetic pole boundary edges are connected by magnetic pole border edges.

13. Rotary solenoid according to claim 1, wherein at least one magnetic pole boundary edge is provided running spirally.

14. Rotary solenoid according to claim 1 wherein at least one magnetic pole boundary edge is provided, and a magnetic pole border edge runs, with reference to the rotational axis, radial or tilted to the radial line, or diagonally or spirally or curved, and wherein the magnetic poles are spaced from each other.

15. Rotary solenoid according to claim 1, wherein material is provided for a permanent magnet of the magnetic pole, a remanence of which changes depending on the rotational angle of the rotor.

16. Rotary solenoid according to claim 1, wherein the length of the second partial pole face corresponds with the radius of a ring of magnetic poles.

17. Rotary solenoid according to claim 1, wherein surface parts are provided and the respective sum of the areas of the surface parts with respectively the same polarity have different sizes.

18. Rotary solenoid according to claim 1, wherein the air gap in axial direction with reference to the rotational axis between the pole face and the rotor disc or the ring of magnetic poles is smaller than the pole gap, and/or the width of the air gap can change depending on the rotational angle of the rotor.

19. Rotary solenoid according to claim 1, wherein the at least one of the partial pole faces is tilted or curved to a reference plane vertically to the rotational axis such that a width of the air gap changes depending on the rotational angle of the rotor.

20. Rotary solenoid according to claim 1, wherein at least one surface of a magnetic pole is tilted or curved to a reference plane vertically to the rotational axis such that a width of the air gap changes depending on the rotational angle of the rotor.

21. Rotary solenoid according to claim 1, wherein the magnetic poles are spaced from each other.

22. Rotary solenoid according to claim 1, wherein surface parts are provided, and the respective sum of the areas of the surface parts of the magnetic poles assigned to the air gap with respectively the same polarity, wherein the surface parts are arranged, seen in the direction of the rotational axis, on the partial pole face, can change depending on the rotational angle of the rotor.

23. Rotary solenoid according to claim 1, wherein surface parts are provided, and the difference of the respective sum of the areas of the surface parts with respectively the same polarity can change depending on the rotational angle of the rotor.

24. Rotary solenoid according to claim 1, wherein an additional pole face is provided and the area of the additional pole face, seen in the direction of the rotational axis, results in a magnetic force supporting the torque to a radial running border edge.

25. Rotary solenoid, comprising:
a stator and a rotor that can rotate around a rotational axis, wherein the rotor has a rotor shaft on which a rotor disc is arranged, and the rotor disc has, seen in the direction of the circumference, alternating magnetically polarized magnetic poles, and the stator receives at least one coil carrying windings of wire conducting electric current, and the windings encircle the rotational axis, and between the coil and the rotor disc a pole face is provided including at least two partial pole faces, including a first partial pole face and a second partial pole face, serving for guiding the magnetic flux of the magnetic field generated by applying current to the windings of the coil, whereby there is at the pole face a magnetic polarization alternating with reference to the rotational axis seen in the direction of the circumference, and between the rotor disc and the pole face an air gap is provided, wherein the magnetic poles of the rotor disc, the air gap and the partial pole faces of the pole face form elements of the magnetic system of the rotary solenoid, and at least one element of the magnetic system is configured along the direction of the circumference direction, depending on the rotational angle of the rotor around the rotational axis changeably in such a way that during switching-off the current through the windings of the coil a torque results resetting the rotor in the starting position, wherein each partial pole face, with reference to the outside arranged boundary edge running in the direction of the circumference, and the boundary edge describes a circle segment with a course of the boundary edge where, depending on the rotational axis, the distance of a point on the boundary edge from the rotational axis has each time a distance changing depending on the rotational angle.

* * * * *